United States Patent Office 3,267,147
Patented August 16, 1966

3,267,147
RECOVERY OF AMINE OXIDE SALTS BY SPRAY DRYING
Stanley R. Sheeran, Wilmington, Del., assignor to E. I. du Pont de Nemours and Company, Wilmington, Del., a corporation of Delaware
No Drawing. Filed Mar. 5, 1963, Ser. No. 262,840
7 Claims. (Cl. 260—583)

This invention relates to the recovery of amine oxides, particularly in solid free-flowing form.

The amine oxides of tertiary amines of the formula

in which each of $R_1$ and $R_2$ is methyl or ethyl and $R_3$ is an alkyl radical having from 8 to 20 carbon atoms are useful for many purposes and particularly as detergents and surface active agents. In some instances, employment of such amine oxides in solution form is most convenient. For such purposes, relatively concentrated solutions, e.g., 30 to 40% aqueous solutions, can be prepared directly by the reaction of the amine with hydrogen peroxide, the reaction being effected at 55 to 75° C. by gradually adding 30 to 75% aqueous hydrogen peroxide to the amine under agitation, and during the course of the reaction adding only that amount of water as is required to dilute the mixture sufficiently to prevent gel formation and permit effective agitation. However, for other purposes such as when the amine oxide is intended for use as a component of a solid detergent composition, availability of such amine oxides in solid free-flowing form would be highly desirable. Furthermore, such solid form could be shipped and stored more economically.

The above amine oxides form pasty hydrates when aqueous solutions thereof are evaporated to dryness. Furthermore, such oxides are too unstable to permit their practical recovery from aqueous solutions by usual spray drying techniques. Thus, at usual spray drying temperatures they tend to decompose with the formation of olefins and substituted hydroxylamines (Cope et al. JACS 79, 4720 (1957)).

It is an object of the invention to provide a method for recovering in solid free-flowing form amine oxides of the above type from aqueous solutions thereof. A particular object is to provide a method whereby such an amine oxide is recovered in dry free-flowing salt form. Another object is to provide a method for recovering such an amine oxide in solid form without significant loss of the amine oxide through decomposition. Further objects will be apparent from the following description.

The objects of the invention are accomplished by heat-drying an aqueous solution of a salt of an amine oxide of the above type and a strong inorganic acid under such conditions that essentially all of the water is rapidly vaporized. More particularly, the aqueous solution of the salt is spray-dried employing an inert or non-reactive (under the conditions of use) gaseous drying medium, such as air, nitrogen or combustion gases, at a temperature of from 80 to 200° C., preferably 90 to 150° C. Conventional spray-drying equipment can be used, it being important only that the drying medium have a temperature of at least 80° C., preferably at least 90° C., in order that vaporization of the water be rapid, but not greater than 200° C., preferably not greater than 150° C., in order that decomposition will not be excessive.

It is not ordinarily possible or practical to spray-dry solutions of the amine oxides themselves under the above conditions because of the instability of the free oxides and because they are hygroscopic and pasty products result.

Tests have indicated that the salt solutions can be drum-dried to yield pastes which solidify on cooling. Although drum-drying in a high vacuum might yield dry products directly, spray-drying under the conditions indicated above is preferred.

The amine oxide salt solution that is spray-dried in accordance with the invention is prepared by adding to an aqueous solution of the amine oxide a strong inorganic acid such as sulfuric acid, phosphoric acid, hydrochloric acid, sodium hydrogen sulfate ($NaHSO_4$) and sodium dihydrogen phosphate ($NaH_2PO_4$). Although solutions of the hydrochloride salts of the amine oxides can be spray-dried, their use is not preferred because of the equipment corrosion problem incurred when handling solutions containing the chloride ion. The preferred salts are the sulfates and sodium hydrogen sulfates, particularly the former.

In preparing the salt solution to be spray-dried, the amine oxide solution and the acid will be employed in approximately stoichiometric proportions, e.g., about 2 moles of the amine oxide per mole of sulfuric acid, and about one mole of amine oxide per mole of sodium hydrogen sulfate. The salt forming reaction is most conveniently effected by adding the acid to an aqueous solution of the amine oxide. It is advantageous to employ relatively concentrated solutions of the amine oxide, e.g. solutions containing 30 to 40% by weight of the oxide. The parent amine and hydrogen peroxide can be reacted to produce such concentrated solutions directly when the reaction is carried out under the conditions previously indicated.

All of the amine oxides of the tertiary aliphatic amines of the formula set forth above can be recovered in solid salt form by the method of the invention. Specific examples thereof are the oxides of dimethyloctylamine, dimethyldecylamine, dimethyldodecylamine, diethyldodecylamine, dimethyltridecylamine, dimethyltetradecylamine, dimethylhexadecylamine and dimethyloctadecylamine. The preferred oxide is that of dimethyldodecylamine.

The invention is illustrated by the following examples in which all composition percentages are by weight.

*Example 1*

1,560 grams of 70% sulfuric acid (11.13 moles $H_2SO_4$) was added under agitation to 16,623 g. of an amine oxide solution containing 21.85 moles of dimethyldodecylamine oxide (DDAO) and 0.38 mole of dimethyldodecylamine (DDA). The resulting solution contained 35.1% of DDAO sulphate, $(DDAO)_2.H_2SO_4$, and 0.7% of dimethyldodecylamine sulfate, $(DDA)_2.H_2SO_4$, and had a pH of about 2.8.

A 300 g. portion of the above solution was diluted with an equal weight of water and fed into a spray drier at a rate of 40 g./min. The temperature of the air fed to the drier was 93° C. The resulting dry free-flowing salt product recovered from the spray drier and from a cyclone separator through which the air stream from the drier was passed was analyzed. The analytical data obtained are presented below along with corresponding data for the solute of the starting solution.

| Material | Analysis, Dry Basis, Percent | | |
|---|---|---|---|
| | DDAO | DDA | $H_2SO_4$ |
| Solute of starting solution | 81.4 | 1.4 | 17.1 |
| Product from drying chamber | 80.6 | 2.4 | 17.0 |
| Product from cyclone | 81.7 | 1.2 | 17.1 |

The spray drying was accomplished with decomposition of only about 1% of the amine oxide.

Example 2

A 480 g. portion of the diluted DDAO sulfate solution of Example 1 was fed into a spray drier at a rate of 50 g./min. The temperature of the air fed in this instance was 121° C. The solid free-flowing salt product collected from the drying chamber and the cyclone separator were analyzed as in Example 1 with the following results:

| Material | Analysis, Dry Basis, Percent | | |
|---|---|---|---|
| | DDAO | DDA | $H_2SO_4$ |
| Solute of starting solution | 81.4 | 1.4 | 17.1 |
| Product from drying chamber | 80.8 | 2.4 | 16.7 |
| Product from separator | 81.8 | 1.1 | 17.1 |

The spray drying was accomplished with decomposition of only about 1% of the amine oxide.

Example 3

Solid samples of dimethyldodecylamine oxide monohydrate, $DDAO \cdot H_2O$, dimethyldodecylamine oxide sulfate, $(DDAO)_2 \cdot H_2SO_4$, and dimethyldodecylamine oxide sodium hydrogen sulfate, $DDAO \cdot NaHSO_4$, were prepared and their stabilities at 100° C. compared. The solid products were obtained by evaporating the appropriate solutions at room temperature with final drying being accomplished in vacuo over $P_2O_5$. The starting solution for the hydrate sample was a 30% aqueous solution of DDAO. The starting solution for the $(DDAO)_2 \cdot H_2SO_4$ sample was the solution prepared in Example 1. The starting solution for the $DDAO \cdot NaHSO_4$ sample was obtained by mixing 60 g. of a 53.3% solution of sodium hydrogen sulfate (0.267 mole $NaHSO_4$) with 198.6 g. of an aqueous solution containing 0.262 mole of DDAO and 0.005 mole of DDA.

Each of the above solid samples was analyzed, then weighed portions of each were heated for 1 hour at 100° C., cooled and re-analyzed. The sample of $DDAO \cdot H_2O$ was heated in a closed container to prevent loss of water. The results tabulated below show the superior stability of the sulfate salts.

| Product | DDAO Content, Percent | | Loss, Percent of Initial |
|---|---|---|---|
| | Initial | After heating | |
| $DDAO \cdot H_2O$ | 92.0 | 85.3 | 7.3 |
| $(DDAO)_2 \cdot H_2SO_4$ | 80.0 | 79.6 | 0.1 |
| $DDAO \cdot NaHSO_4$ | 65.9 | 65.9 | 0.0 |

In a similar stability test in which samples of $DDAO \cdot H_2O$ (monohydrate) and DDAO (anhydrous) were heated for 0.5 hour at 124° C., the DDAO loss for the monohydrate sample was 33.7% while that for the anhydrous sample was 60.5%. These results show that the anhydrous compound is substantially less stable than the monohydrate.

The spray-drying procedures of Examples 1 and 2 can be employed with generally similar results to recover in solid salt form any of the oxides of the tertiary aliphatic amines of the formula set forth above. The salt solutions which are spray dried will generally be simple aqueous solutions, however, they may include other solvents such as the lower alcohols. When the starting solution is relatively concentrated, it may be desirable to dilute it somewhat before feeding it to the drier, as was done in Examples 1 and 2, in order to improve physical performance in the drier. The amount of dilution required, if any, will depend upon the original concentration of the solution and to some extent upon the particular amine oxide salt whose solution is to be dried. When the solid amine oxide salt product is to be employed as a component of a solid detergent composition which is to include an inert filler such as sodium sulfate, or a builder such as sodium tripolyphosphate, it is possible to mix such a filler and/or such a builder with the amine oxide salt solution prior to spray drying the latter. Such a practice improves somewhat the spray drying properties of the amine oxide salt.

The embodiments of the invention in which an exclusive property or privilege is claimed are as follows:

1. In the recovery of an amine oxide of a tertiary aliphatic amine of the formula

wherein each of $R_1$ and $R_2$ is from the group consisting of methyl and ethyl radicals and $R_3$ is an alkyl radical having from 8 to 20 carbon atoms, from an aqueous solution of said amine oxide, the improvement comprising reacting said solution with a strong inorganic acid so as to form a solution of the salt of said amine oxide and said acid and spray drying the latter solution at a temperature in the range from 80 to 200° C.

2. The method of claim 1 wherein the solution of the salt is spray dried at a temperature of from 90 to 150° C.

3. The method of claim 1 wherein the acid is sulfuric acid.

4. The method of claim 1 wherein the acid is sodium hydrogen sulfate.

5. The method of claim 1 wherein the acid is phosphoric acid.

6. The method of claim 1 wherein the amine oxide is dimethyldodecylamine oxide.

7. The method of claim 1 wherein the amine oxide is dimethyldodecylamine oxide, the acid is sulfuric acid and the solution of the salt is spray dried at a temperature of from 90 to 150° C.

References Cited by the Examiner

UNITED STATES PATENTS 2,169,976   8/1939   Guenther et al.
2,957,519   10/1960   Walker _____ 159—48 X CHARLES B. PARKER, *Primary Examiner.*

A. H. SUTTO, *Assistant Examiner.*